Oct. 14, 1941.  C. J. BASSLER  2,258,878
FLUID METERING DEVICE
Filed Feb. 20, 1939
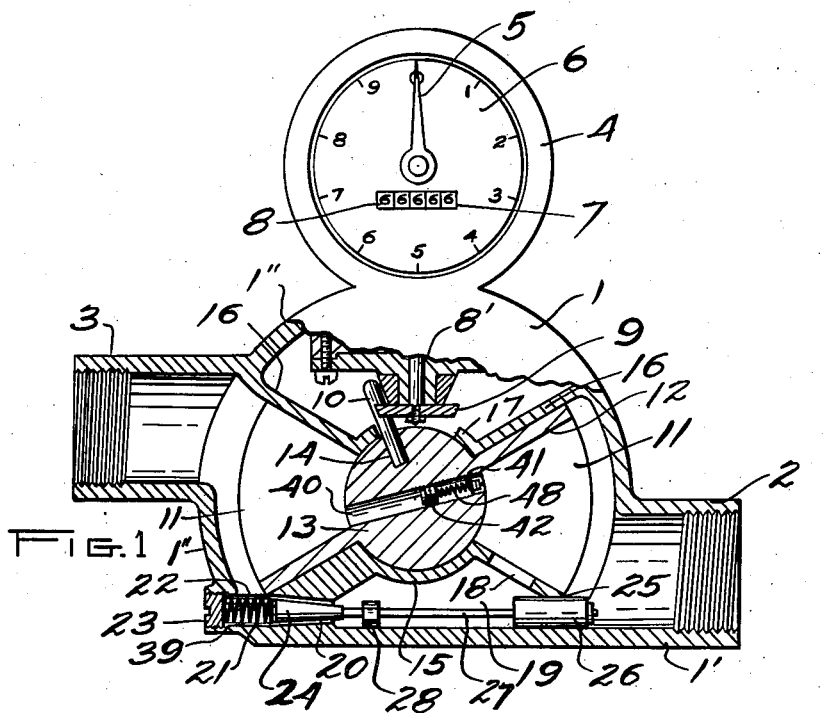
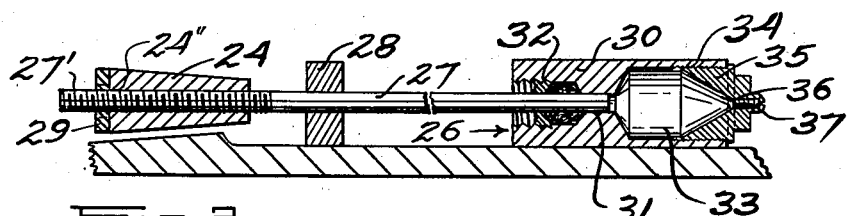
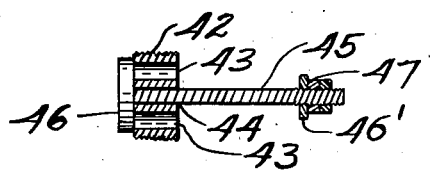
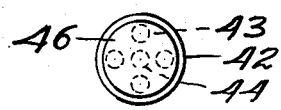
INVENTOR
CARLOS J. BASSLER
BY
Earl E Moore
ATTORNEY Patented Oct. 14, 1941

2,258,878

UNITED STATES PATENT OFFICE 2,258,878

FLUID METERING DEVICE

Carlos J. Bassler, Alhambra, Calif., assignor, by mesne assignments, to Bank of America National Trust and Savings Association Application February 20, 1939, Serial No. 257,378

5 Claims. (Cl. 73—254)

This invention pertains to means for accurately measuring fluids while passing through a metering device. Means are provided for automatically varying the movement of the indicator of the meter so that its reading will be in certain definite units of measurement based with respect to the weight, temperature and pressure changes of the fluid being metered. It is not enough to merely indicate the amount of fluid flowing through a metering chamber by taking into account the passing volumes of the fluid alone, for the temperature and pressure thereof is of vital importance for accuracy and must be considered. Particular reference is made to the measuring of liquid such as oil, gasoline and so forth wherein large differentials of temperature are met and must be taken into account. The true reading of a meter can only be depended upon when its volumetric or weight units are reckoned in accordance with some specific temperature, which in accordance with present day practice is generally set at 60° F.

According to the U. S. Bureau of Standards and the American Petroleum Institute, a U. S. gallon of petroleum or derivatives is the apparent weight of 231 cu. in. at 60° F. at sea level; therefore, this invention, in consideration of the foregoing, automatically converts ordinary liquid measuring devices and the like into metering means that indicate the weight of fluid that has passed through it. When the invention is applied to meters, now in general use, the reading thereof can be in U. S. gallons or units of weight.

Temperature correcting means must be free of complicated mechanisms in order to assure long life and dependability with a minimum of care and inspections. By the invention herein described and claimed, non-complicated means are provided for correcting the meter reading prior to its registration in accordance with the variable characteristics of the fluid passing through its chambers. By this invention, flowing fluid has its volumes measured with respect to some specific temperature through dependable mechanical mechanism which compensates automatically for temperature and pressure differences.

An object of the invention is to provide means for accurately indicating the true weight and/or volume of fluid passing through a meter by correcting for temperature and pressure differences of the fluid being measured.

Another object is to indicate automatically at some specific temperature a true meter reading of fluid that has passed a given point, in a simplified manner.

Other objects, advantages and features of my invention will appear from the accompanying drawing, the subjoined detailed description, the preamble of these specifications and the appended claims.

Applicant is about to illustrate and describe one form of his invention in order to teach one how to make, use and vend the same, but it is to be understood that the drawing and description thereof are not to limit the invention in any sense whatsoever, except as limited by the appended claims.

In the drawing:

Fig. 1 shows an elevation of the preferred form of the invention, parts thereof being broken away to show the internal arrangement in section.

Fig. 2 shows a vertical cross section of a detail of Fig. 1.

Fig. 3 shows in cross section another detail of Fig. 1.

Fig. 4 shows in elevation a part of Fig. 3.

In the preferred form of the invention, legended Figs. 1 to 4 inclusive, is shown a meter casing 1 which houses the moving parts which are acted upon by the flow of fluid through the casing. The casing has an inlet pipe 2 and the outlet pipe 3 which are connected in the main flow pipe line of the fluid to be measured and which may be oil, gasoline or any other fluid capable of being measured by the means herein claimed.

The casing has a bottom wall 1' which is substantially flat and merges into a curved side and top wall 1''. One side of the casing may be removable (not shown) so as to gain access to the interior and place the internal working parts thereon. Since such types and casings are well known in the metering art, no further details of the casing will be given for the sake of simplicity.

The numeral 4 indicates the registering housing of the meter which contains the usual and well known metering wheel units for operating the pointer 5 over the surface of the dial 6 which in this particular case has its periphery divided into ten divisions. An opening 7 which is common to such types of meters provides a window through which to observe the numerals which indicate the total amount of fluid which has passed through the measuring chamber of the housing 1, the mechanism of which is indicated by the reference character 8.

A rotary shaft 8' extends from the mechanism 8 into the measuring chamber via of suitable bearings and terminates in its lower extremity with a beveled disc 9 to which it is rigidly fixed. The disc 9 is slotted to receive a post 10, as shown, which is allowed to rotate in the slot.

Within the measuring chamber 11 is socketed a wabble disc 12 having a spherical center 13 which is bored at 14 to receive the post 10 in fixed relation therewith. Since the foregoing elements just related are well known and old in the art, no further detailed description will be made of them. The post 10 is merely made to swing about the shaft 8' by action of the wabble disc 12 and cause the shaft 8' to operate the revolution counter mechanism 8 and the pointer 5. Obviously, the disc is made to wabble by the pressure of the fluid entering through the inlet 2 and escaping via the outlet 3.

In the bottom of the measuring chamber is a partition 15 having a curved portion to journal the lower surface of the spherical center 13, and at the top of the chamber is the inverted-conical-like partition 16, positioned as shown, and having curved flanges 17 about the spherical center 13 as a component journal part in connection with the curved part of the partition 15. They are coordinated in a manner to permit the free wabbling movement of the disc 12 caused by the pressure drop between the inlet pipe 2 and the outlet pipe 3.

The lower partition 15 has one or more perforations 18 to permit part of the fluid entering the pipe 2 to enter the by-pass chamber 19. A tapered bore 20 passes through the partition 15 and emerges into a cylindrical chamber 21 which is opened along parts of its upper wall as at 22 to permit fluid from the chamber 21 to pass freely to the outlet pipe 3. One end of the cylindrical chamber 21 is threaded so as to receive a removable threaded cap 23.

Within the tapered passage 20 is a valve head 24 which is tapered in agreement with the passage 20 so that when the valve head is moved to the right, it can close the passage and prevent fluid passing therethrough. In an opening 25 beneath the perforation 18 of the partition 15 there is securely fixed a thermostat element 26 from which extends a piston rod 27 having secured at one end thereof the valve head 24. A journal block 28 fixed to the bottom wall of the casing supports the piston rod near the valve head so as to permit its free movement longitudinally therethrough and maintain its proper spacing with the tapered walls 20. One end of the piston rod 27 has a running thread 27' (see Fig. 2) which receives a threaded bore 24' of the valve head and permits its adjustment axially along the rod 27. The valve head is held in adjustment by lock nut 29 which can be reached for adjustment by removing the cap 23.

The thermostat comprises a block 30 which is divided into a plurality of chambers. Between the chambers is a bore 31 to act as a guide for and to receive an end portion of the piston rod and allow the rod to reciprocate therein. A packing gland 32 is provided in one of the chambers to prevent escape of fluid along the rod. The numeral 33 indicates the other chamber which is tapered at both ends. An end of the wall of chamber 33 is threaded as at 34 to receive the tapered plug 35. A bore 36 is provided through the plug as shown and which is closed by a screw 37. The bore 36 is used as the filler opening through which to insert the fluid designed to operate the thermostat.

The chamber 33 is filled with an expansible fluid which is thermally acted upon by the heat changes of the fluid being measured in chamber 11. The fluid placed in the chamber 33 is generally a portion of the same fluid that is being measured, the expansion of which will cause the rod 27 to move so as to further open the passage 20 and thus permit a greater flow of fluid therethrough. Intermediate the plug 23 and valve head 24 is a compression spring 39 which has a diameter less than the diameter of the plug so that it can easily be removed through the plugged opening; this is also true of the valve head and its stem. Whenever it is desired to replace these parts or repair them, the casing and its parts therein need not be disturbed as it is only necessary to remove the plug 23. When the fluid in the chamber 33 contracts, the compression spring 39 will cause the valve head to move and further close the passage so as to further restrict the flow of fluid through the passage 20. By this arrangement, any thermal change of the fluid being measured, will vary the amount thereof passing through the by-pass and thus improve the accuracy of the meter reading. When the fluid being measured is above a certain specific temperature, the amount of the fluid through the by-pass will be the volumetric increase of the fluid over its volume at that certain temperature. The converse is true when the fluid is below a certain specific temperature.

The valve head 24 is adjusted upon the rod 27 so that a predetermined amount of the fluid being measured will by-pass the chamber 11 through the opening 18 at a 60° F. temperature, and the meter indicator adjusted accordingly to give a correct reading at this temperature. When the fluid in the chamber 11 is at a higher temperature than 60° F., its volume thus increased in proportion, the confined fluid in the chamber 33 of the thermostat will have its volume increased a like amount and cause further opening of the passage 20 so as to permit a greater volume of fluid to by-pass the wabbling disc 12, so as to compensate for the increase in volume of the fluid being measured and thus compensate for the volumetric difference without interfering with the meter reading. The converse operation results when the fluid being measured in chamber 11 is cooler than 60° F., thus causing further restriction of the passage 20 by the valve head and hence slightly decreasing the flow therethrough. Any change in the totalizing indicator in the window 7 obviously causes a like change in the movement of the pointer 5 around the dial 6 since the pointer must completely swing around the dial and cover ten divisions indicating ten gallons while the total reading in the window 7 indicates ten additional gallons.

Under varying pressures, fluid can not be accurately measured unless provision is made to allow some of the fluid to by-pass the disc when the pressure drop across the meter is high. The wabbling disc is set to operate in a manner so as to indicate in the meter reading a certain amount at ordinary pressure drops across the meter, but, however, when the pressure drop is above a certain allowable factor, means are provided for releasing part of the pressure drop across the meter so as not to race the wabbling action of the disc 12 and cause inaccuracy of the meter reading. To provide for this event, the spherical center 13 has a bore 40 which is threaded along the section thereof indicated at 41 in which is a threaded ring 42 having a plurality of perforations 43. A central bore 44 is provided in which is journalled a valve stem 45 having the valve head 46 at one end thereof which normally closes the perforations 43. One end of the valve stem is threaded to receive a ring 46' and lock nuts 47 for adjustment of the ring along the valve stem. A spring 48 envelopes the valve stem 45 and is situated intermediate the ring 42 and ring 46' so as to constantly urge the valve head 46 against the ring 42 and into closing position with the perforations 43. The valve head is set to open at a certain predetermined pressure, the adjustment of which is made by moving the ring 46' along the valve stem.

Means are, therefore, provided to compensate for differences of temperature and pressure drop in the meter, to attain accuracy so that the meter reading will be true under such varying conditions. Although the wabble type of meter may be preferable to other types for measuring gasoline and the like at automobile service stations, the compensating means herein described is not limited to such metering devices.

Having thus described my invention, what is claimed as new and desired to be secured by Letters Patent is:

1. In a wabbler type metering device having a casing and divided into a plurality of chambers, one of the chambers having connection with an inlet pipe and another of the chambers having connection with an outlet pipe, means intermediate said chambers to be set in motion by fluid flowing between the inlet and outlet pipes, there being a plurality of passages connecting said chambers, one of the passages having a thermostatic element and valve means for compensating for fluid volumetric differences due to temperature changes of the fluid, and another passage having a check valve means to compensate for large pressure differences due to changes in fluid pressure drops across the device, said latter two means being exposed to the fluid passing through the device from the inlet pipe to the outlet pipe so as to be operative at substantially the same periods of time.

2. In a metering device having an outer casing with an inlet and outlet for liquid to be measured, a measuring chamber in the casing between the inlet and outlet having a wabbler; a by-pass connecting the inlet and outlet, and having a valve to control the liquid passing therethrough, temprature responsive means connected to the valve and exposed to the liquid being measured so that the amount of liquid passing through the by-pass is dependent upon the temperature of the liquid, walls extending from near the inlet to near the outlet forming the by-pass, said walls being provided with alined openings, one opening accommodating the temperature responsive means and another opening the valve, the casing having a plug in an opening in alinement with the wall openings so that the head of the valve and its stem can be passed through the opening in the casing when the plug is removed.

3. In a metering device having an outer casing with an inlet and outlet for liquid to be measured, a measuring chamber in the casing between the inlet and outlet having a wabbler; a by-pass connecting the inlet and outlet, and having a valve to control the liquid passing therethrough, temperature responsive means connected to the valve and exposed to the liquid being measured so that the amount of liquid passing through the by-pass is dependent upon the temperature of the liquid, said casing having a removable plug, walls near the inlet and outlet forming the by-pass and having openings alined with the plug in the casing, one of the wall openings accommodating the temperature responsive means and the other opening having a long tapered bore and a long tapered head for the valve, a coiled spring intermediate the valve head and plug urging the valve to a closed position.

4. In a metering device having an outer casing with an inlet and outlet for liquid to be measured, a measuring chamber in the casing between the inlet and outlet having a wabbler; a by-pass connecting the inlet and outlet, and having a valve to control the liquid passing therethrough, temperature responsive means connected to the valve and exposed to the liquid being measured so that the amount of liquid passing through the by-pass is dependent upon the temperature of the liquid, a pressure release element in said wabbler designed to open at predetermined drops in pressure across the metering device.

5. In a metering device having an outer casing with an inlet and outlet for liquid to be measured, a measuring chamber in the casing between the inlet and outlet having a wabbler; an irregular wall at the bottom of the casing providing a by-pass intermediate the inlet and outlet, a long tapered valve in the by-pass to control the liquid passing therethrough, temperature responsive means connected to the valve and exposed to the liquid being measured so that the amount of liquid passing through the by-pass is dependent upon the temperature of the liquid, said casing being provided with an opening closed by a removable plug, said wall near the inlet and outlet of the casing having openings alined with the plugged opening in the casing, one of the wall openings having a long tapered bore to receive said valve, and another of the wall openings accommodating the temperature responsive means.

CARLOS J. BASSLER.